US009858714B2

(12) United States Patent
Saito

(10) Patent No.: US 9,858,714 B2
(45) Date of Patent: Jan. 2, 2018

(54) SHAPE OPTIMIZATION ANALYZING METHOD AND APPARATUS THEREFOR

(71) Applicant: JFE STEEL CORPORATION, Chiyoda-ku, Tokyo (JP)

(72) Inventor: Takanobu Saito, Chiba (JP)

(73) Assignee: JFE Steel Corporation, Tokyo (JP)

( * ) Notice: Subject to any disclaimer, the term of this patent is extended or adjusted under 35 U.S.C. 154(b) by 19 days.

(21) Appl. No.: 14/440,502

(22) PCT Filed: Nov. 6, 2012

(86) PCT No.: PCT/JP2012/007100
§ 371 (c)(1),
(2) Date: May 4, 2015

(87) PCT Pub. No.: WO2014/073017
PCT Pub. Date: May 15, 2014

(65) Prior Publication Data
US 2015/0302641 A1   Oct. 22, 2015

(51) Int. Cl.
*G06T 17/00* (2006.01)
*G06T 17/10* (2006.01)
*G06F 17/50* (2006.01)

(52) U.S. Cl.
CPC .......... *G06T 17/10* (2013.01); *G06F 17/5018* (2013.01); *G06F 17/5095* (2013.01);
(Continued)

(58) Field of Classification Search
None
See application file for complete search history.

(56) References Cited

U.S. PATENT DOCUMENTS 8,126,684 B2    2/2012  Goel
2007/0239411 A1  10/2007  Yamashita
(Continued)

FOREIGN PATENT DOCUMENTS

JP    2001297118    10/2001
JP    2007179456     7/2007
(Continued)

OTHER PUBLICATIONS

Korean Office Action dated Mar. 17, 2016 for Korean Application No. 2015-7011265 with Concise Statement of Relevance.
(Continued)

*Primary Examiner* — Martin Mushambo
(74) *Attorney, Agent, or Firm* — RatnerPrestia

(57) ABSTRACT

Shape optimization analyzing methods according to aspects of the present invention are analysis methods for optimizing part of a structure model using plane elements or three-dimensional elements. The methods include a design-space defining step of defining a portion of the structure model that is to be optimized as a design space, an optimization-block-model generating step of generating an optimization block model in the defined design space, the optimization block model being formed of three-dimensional elements and analyzed for optimization, a coupling step of coupling the generated optimization block model with the structure model, and an analyzing step of performing analysis in accordance with input of an analytic condition to calculate an optimal shape of the optimization block model.

11 Claims, 16 Drawing Sheets

(52) U.S. Cl.
CPC ...... *G06F 2217/08* (2013.01); *G06F 2217/42* (2013.01); *G06T 2207/10004* (2013.01); *G06T 2207/30248* (2013.01); *G06T 2219/2004* (2013.01)

(56) References Cited

U.S. PATENT DOCUMENTS

2010/0262406 A1* 10/2010 Goel .................. G06F 17/5095 703/2
2011/0137443 A1* 6/2011 Farahani ............. G06F 17/5009 700/98

FOREIGN PATENT DOCUMENTS

| JP | 2010250818 | 11/2010 |
| JP | 2011257915 | 12/2011 |
| WO | 2006009026 | 1/2006 |

OTHER PUBLICATIONS

Extended European Search Report in European Application No. 12888094.5-1954 dated Dec. 9, 2015.
Mihaylova, P., et al., "Beam bounding box—a novel approach for beam concept modeling and optimization handling," May 12, 2012, pp. 13-24, vol. 60, Finite Elements in Analysis and Design, Amsterdam, NL.
Woon, S., et al., "Effective optimization of continuum topologies through a multi-GA system," Aug. 12, 2005, pp. 3416-3437, vol. 194, No. 30-33, Computer Methods in Applied Mechanics and Engineering, North-Holland, Amsterdam, NL.
Yamada, T., et al., "A topology optimization method based on the level set method incorporating a fictitious interface energy," Nov. 15, 2010, pp. 2876-2891, vol. 199, No. 45-48, Computer Methods in Applied Mechanics and Engineering, North-Holland, Amsterdam, NL.
International Search Report for International Application No. PCT/JP2012/007100 dated Feb. 12, 2013.

* cited by examiner (a)

(b)

(a)

(b)

(a)

(b)

(a)

(b)

(a)

(b)

(a)

(b)

(a)

(b)

(a)

(b)

(a)

(b)

SHAPE OPTIMIZATION ANALYZING METHOD AND APPARATUS THEREFOR

CROSS REFERENCE TO RELATED APPLICATIONS

This is the U.S. National Phase application of PCT/JP2012/007100, filed Nov. 6, 2012, the disclosure of which is incorporated herein by reference in its entirety for all purposes.

FIELD OF THE INVENTION

The present invention relates to shape optimization analyzing methods and apparatuses therefor of structural body. Aspects of the present invention relate in particular to the structure shape optimization analyzing method and an apparatus therefor for enhancement of the rigidity of the structure such as an automobile as well as weight reduction of the structure or for enhancement of crash worthiness of the structure as well as weight reduction of the structure.

Herein, the term "shape optimization" represents, not to calculate an optimal shape based on an assumption of a predetermined shape, such as a T shape, but to calculate an optimal shape without assuming a predetermined shape and with satisfying analytic conditions.

BACKGROUND OF THE INVENTION

In consideration of environmental problems, the automotive industry, in particular, has been pursuing weight reduction of automotive bodies in these years and analysis using a computer-aided engineering (referred to as "CAE analysis", below) is a technology indispensable to automotive body designing.

It is known that the CAE analysis involves optimization technology such as mathematical optimization, thickness optimization, shape optimization, or topology optimization to enhance the rigidity or to reduce the weight and is often used for optimizing the structure of castings such as an engine block.

Among optimization technologies, an attention is particularly paid to topology optimization. The topology optimization is a method that includes installing three-dimensional elements in a design space of a certain size and forming an optimal shape that satisfies given conditions by leaving minimum part of the three-dimensional elements that satisfies the given conditions. Thus, the topology optimization is a method that includes directly constraining three-dimensional elements forming a design space and directly applying a load to the three dimensional elements.

As an example of the technology related to such topology optimization, Patent Literature 1 discloses a method for topology optimization of components of a complex structure.

PATENT LITERATURE

PTL 1: Japanese Unexamined Patent Application Publication No. 2010-250818

SUMMARY OF THE INVENTION

A structure such as an automotive body is mainly made of steel sheets. For optimization of a portion of such a automotive body made of steel sheets, separating the portion as a design space and reflecting the loaded or constrained state on the design space are difficult, whereby, disadvantageously, applying the optimization technology to part of a structure has been difficult.

Even though an optimal shape has been calculated using three-dimensional elements, how the optimal shape is appropriately reflected on a steel-sheet structure remains unsolved.

The technology disclosed in Patent Literature 1 relates to a mathematical processing method and a physical system for analysis and is not provided for solving any of the above-described problems. Thus, the development of a technology for solving the above-described problems has been awaited.

Aspects of the present invention are made to solve the above-described problems and aims to provide a technology contributing to optimization of a structure that receives external force by enabling an application of optimization technology to part of the structure.

Aspects of the present invention provide a shape optimization analyzing method and a shape optimization analyzing apparatus described below.

(1) A shape optimization analyzing method for optimizing part of a structure model using plane elements or three-dimensional elements, including a design-space defining step of defining a portion of the structure model that is to be optimized as a design space; an optimization-block-model generating step of generating an optimization block model in the defined design space, the optimization block model being formed of three-dimensional elements and analyzed for optimization; a coupling step of coupling the generated optimization block model with the structure model; and an analyzing step of performing analysis in accordance with input of an analytic condition to calculate an optimal shape of the optimization block model.

(2) The shape optimization analyzing method described in the paragraph (1), wherein the three-dimensional elements forming the optimization block model are three-dimensional elements of any of pentahedrons, hexahedrons, heptahedrons, and octahedrons, each three-dimensional element including at least one pair of two parallel surfaces.

(3) The shape optimization analyzing method described in the paragraph (1) or (2), wherein in the optimization-block-model generating step, the optimization block model that extends along surfaces of the structure model that define the design space and in which the three-dimensional elements are finely divided parallel to a surface of the design space having the largest area is generated.

(4) The shape optimization analyzing method described in any one of the paragraphs (1) to (3), wherein in the optimization-block-model generating step, the optimization block model is generated by disposing nodes at connection portions at which the optimization block model is to be coupled with the plane elements or the three-dimensional elements forming the structure model and by stacking hexahedron three-dimensional elements, used as the three-dimensional elements that form the optimization block model, so that the three-dimensional elements are arranged along flat surfaces including the nodes disposed at the connection portions.

(5) The shape optimization analyzing method described in any one of the paragraphs (1) to (4), wherein the optimization block model includes a plurality of block bodies formed of three-dimensional elements, and the plurality of block bodies are coupled together with rigid elements, beam elements, or plane elements.

(6) The shape optimization analyzing method described in any one of the paragraphs (1) to (5), wherein discretization is performed using an optimization parameter in optimization calculation using numerical analysis.

(7) A shape optimization analyzing apparatus that performs optimization calculation using numerical analysis on a shape of part of a structure model formed of plane elements or plane elements and three-dimensional elements, including a design-space defining unit that defines a portion of the structure model that is to be optimized as a design space; an optimization-block-model generating unit that generates an optimization block model in the defined design space, the optimization block model being formed of three-dimensional elements and analyzed for optimization; a coupling unit that couples the generated optimization block model with the structure model; an analytic-condition input unit that inputs an analytic condition for analysis on a desired portion of the structure model; and an optimization analyzing unit that performs optimization calculation using numerical analysis on the optimization block model on the basis of the input analytic condition.

(8) The shape optimization analyzing apparatus described in the paragraph (7), wherein the three-dimensional elements forming the optimization block model are three-dimensional elements of any of pentahedrons, hexahedrons, heptahedrons, and octahedrons, each three-dimensional element including at least one pair of two parallel surfaces.

(9) The shape optimization analyzing apparatus described in the paragraph (7) or (8), wherein the optimization-block-model generating unit generates the optimization block model that extends along surfaces of the structure model that define the design space and in which the three-dimensional elements are finely divided parallel to a surface of the design space having the largest area.

(10) The shape optimization analyzing apparatus described in any one of the paragraphs (7) to (9), wherein the optimization-block-model generating unit generates the optimization block model by disposing nodes at connection portions at which the optimization block model is to be coupled with the plane elements or the three-dimensional elements forming the structure model and by stacking hexahedron three-dimensional elements, used as the three-dimensional elements that form the optimization block model, so that the three-dimensional elements are arranged along flat surfaces including the nodes disposed at the connection portions.

(11) The shape optimization analyzing apparatus described in any one of the paragraphs (7) to (10), wherein the optimization-block-model generating unit generates the optimization block model with a plurality of blocks formed of three-dimensional elements, and the plurality of blocks are coupled together with rigid elements, beam elements, or plane elements.

(12) The shape optimization analyzing apparatus described in any one of the paragraphs (7) to (11), wherein the optimization analyzing unit performs discretization using an optimization parameter in optimization calculation using numerical analysis.

(13) A shape optimization analyzing apparatus described in any one of the paragraphs (7) to (12), wherein the optimization analyzing unit performs optimization calculation using topology optimization.

Aspects of the present invention include a design-space defining step of defining a portion of the structure model that is to be optimized as a design space, an optimization-block-model generating step of generating an optimization block model in the defined design space, the optimization block model being formed of three-dimensional elements and analyzed for optimization, a coupling step of coupling the generated optimization block model with the structure model, and an analyzing step of performing analysis in accordance with input of an analytic condition to calculate an optimal shape of the optimization block model. Thus, the load can be appropriately transmitted to the optimization block model through the connection portions at which the optimization block model is coupled with the structure model, whereby an optimal shape can be accurately calculated.

This accurate calculation enables, for example, optimization of an automotive body structure, enhancement of the rigidity or crash worthiness, and reduction of the weight while the rigidity or crash worthiness is/are regulated at predetermined values.

DETAILED DESCRIPTION OF EMBODIMENTS OF THE INVENTION

Figure 1:
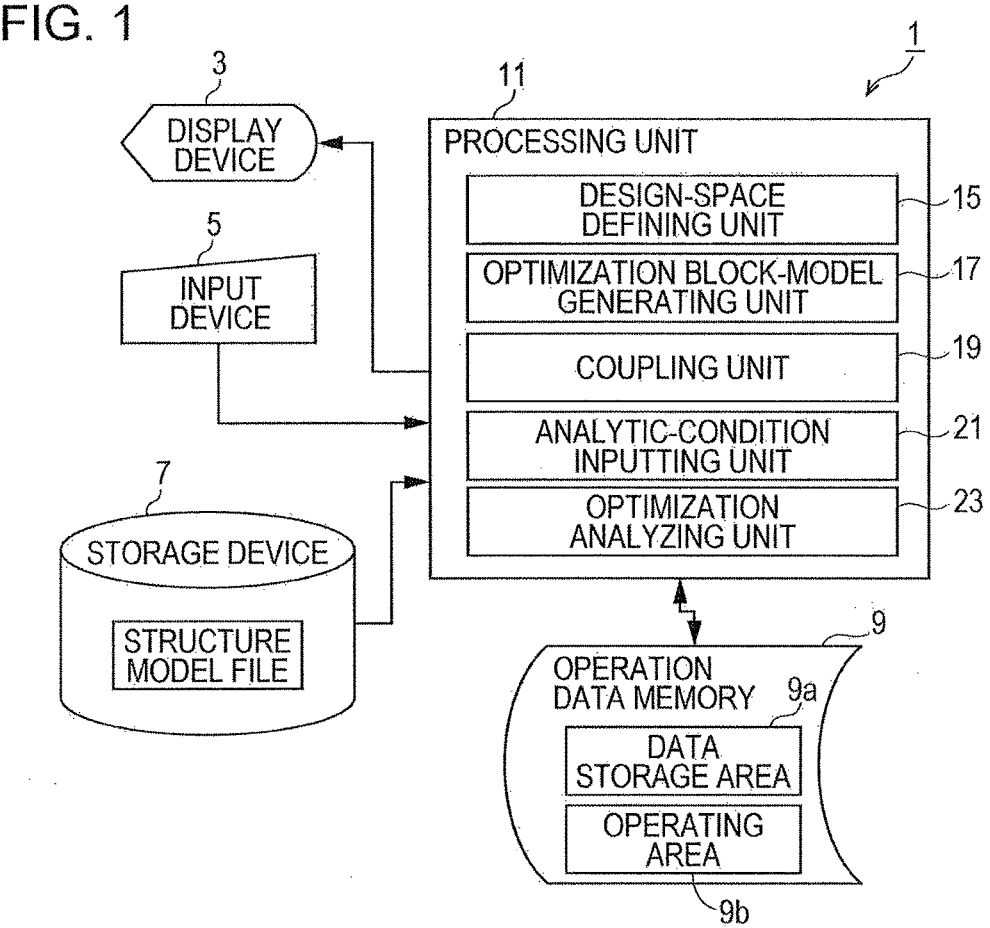
FIG. 1 is a block diagram of a shape optimization analyzing apparatus according to an embodiment of the present invention.
Figure 2:
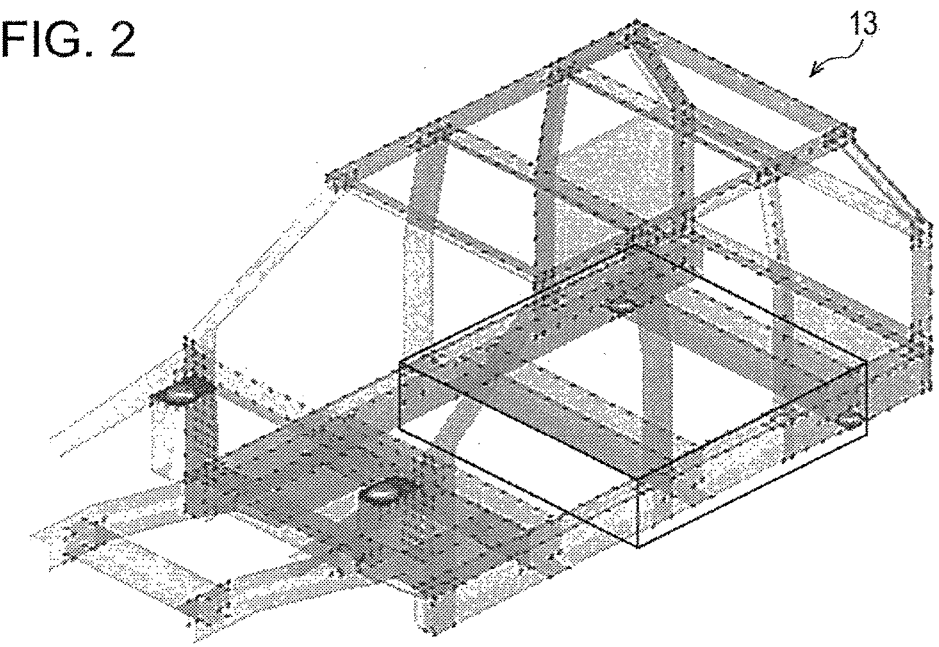
FIG. 2 illustrates an example of a structure model.

As illustrated in FIG. 1, a shape optimization analyzing apparatus 1 according to an embodiment is an apparatus for performing optimization calculation on the basis of numerical analysis of the shape of a portion of a structure model 13 formed of plane elements or plane elements and three-dimensional elements, an example of which is illustrated in FIG. 2. The shape optimization analyzing apparatus 1 is formed of a personal computer (PC) and includes a display device 3, an input device 5, a storage device 7, an operation data memory 9, and a processing unit 11.

The display device 3, the input device 5, the storage device 7, and the operation data memory 9 are connected to the processing unit 11 and operate in accordance with commands of the processing unit 11.

<Display Device>

The display device 3 is used for displaying calculation results or for other purposes, and is, for example, a liquid crystal monitor.

<Input Device>

The input device 5 is used when a file of the structure model 13 is instructed to be displayed or when an operator inputs conditions, or for other purposes. The input device 5 includes components such as a keyboard and a mouse.

<Storage Device>

The storage device 7 stores various types of information at least including the file of the structure model 13. The structure model 13 may be formed only of plane elements or may be formed of a combination of plane elements and three-dimensional elements. When, for example, an automotive body (body) illustrated in FIG. 2 is taken as an example of the structure model 13, the automotive body is mainly made of steel sheets and the structure model 13 is thus formed of plane elements. On the other hand, a block body formed of castings such as an engine is formed of three-dimensional elements.

<Operation Data Memory>

The operation data memory 9 includes a data storage region 9a for storing calculation results and an operation region 9b for performing calculation.

<Processing Unit>

The processing unit 11 is a central processing unit (CPU) of, for example, a personal computer (PC) and each of the units described below are implemented with the CPU executing a predetermined program. The processing unit 11 includes a design-space defining unit 15, an optimization-block-model generating unit 17, a coupling unit 19, an analytic-condition input unit 21, and an optimization analyzing unit 23.

Figure 3:
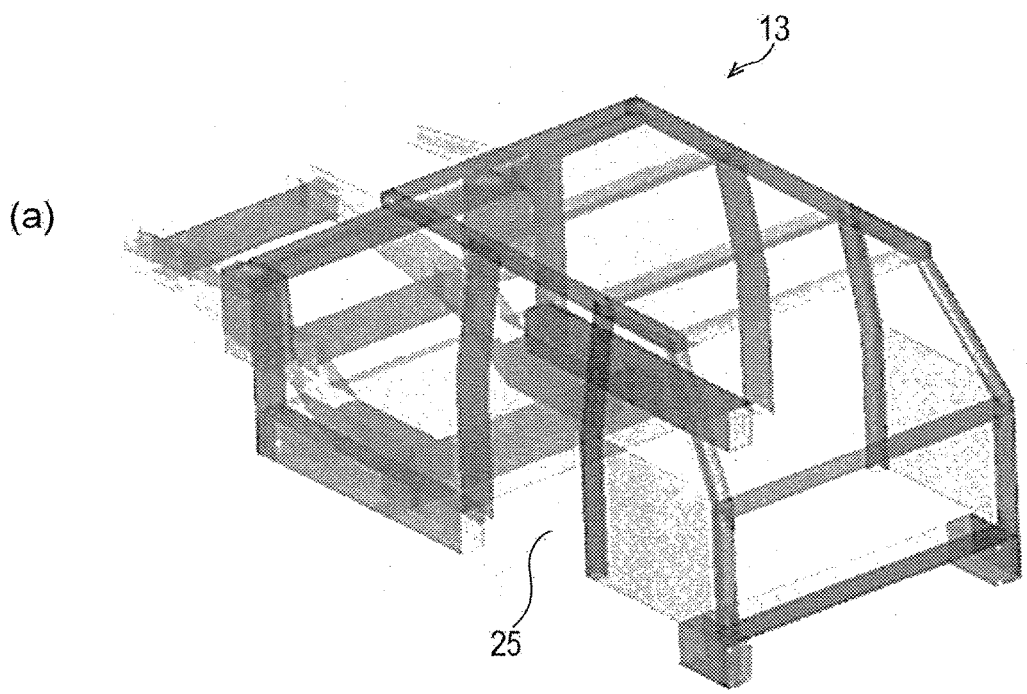
FIG. 3 illustrates a structure model having a portion defined as a design space.
Figure 3:
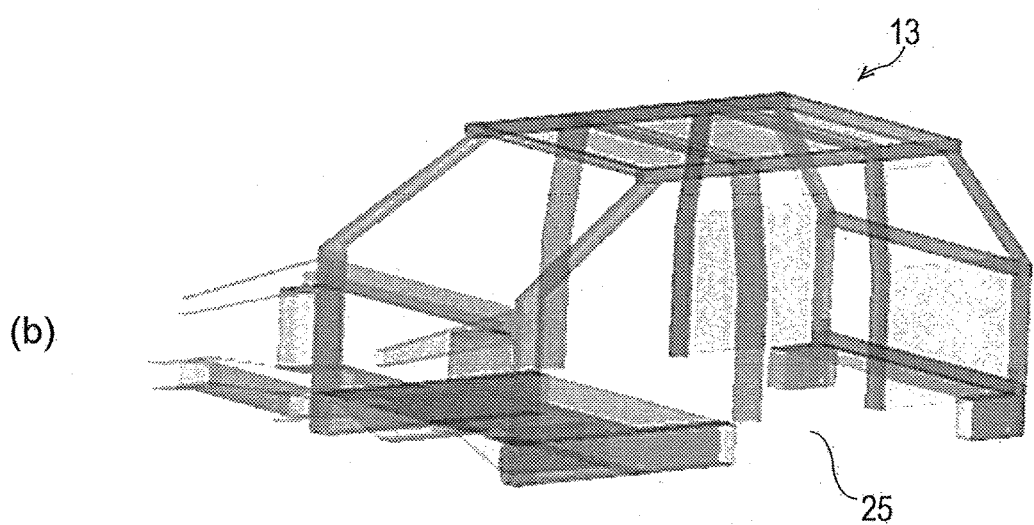

The design-space defining unit 15 defines a design space 25 in part of the structure model 13 that is to be optimized, an example of which is illustrated in FIG. 3.

The optimization-block-model generating unit 17 generates an optimization block model in the defined design space 25, the optimization block model being formed of three-dimensional elements and analyzed for optimization.

The coupling unit 19 couples the generated optimization block model with the structure model 13.

The analytic-condition input unit 21 inputs an analytic condition used for analysis on a desired portion of the structure model 13.

The optimization analyzing unit 23 performs optimization calculation using numerical analysis on the optimization block model on the basis of the input analytic condition.

The configuration of each unit is described in detail with reference to exemplary embodiments.

[Design-Space Defining Unit]

The design-space defining unit 15 defines a portion of the structure model 13 that is to be optimized as a design space 25. In the structure model 13 illustrated in FIG. 2, a portion surrounded by a rectangle is illustrated at a portion below the floor in a center portion of an automotive body. In this example, this portion is a portion defined as a design space 25.

After the design-space defining unit 15 defines a portion of the structure model 13 as a design space 25, part of the structure model 13 in the portion is eliminated and the eliminated part serves as the design space 25, as illustrated in FIG. 3. FIGS. 3(a) and 3(b) illustrate the state where the design space 25 has been defined, viewed from different angles.

The above example is the case where the design-space defining unit 15 defines a design space 25 by eliminating part of the structure model 13. However, a design space 25 may be defined in advance when the structure model 13 is generated. In the case where the design space 25 is defined in advance when the structure model 13 is generated, a unit of generating the structure model 13 itself also serves as the design-space defining unit 15. In other words, a design-space defining unit 15 according to aspects of the present invention may have a function of generating a structure model 13.

[Optimization-Block-Model Generating Unit]

The optimization-block-model generating unit 17 generates, in the specified design space 25, an optimization block model 27 that is to be analyzed for optimization.

The optimization block model 27 that is to be generated may have any shape with a size containable in the specified design space 25.

The optimization block model 27 is formed of three-dimensional elements and preferably three-dimensional elements of any of pentahedrons, hexahedrons, heptahedrons, and octahedrons and having at least one pair of two parallel surfaces. This is because, in the case where the portion formed in the design space 25 is formed of steel sheets, such as a portion of a automotive body, and when optimization calculation is performed on the design space 25 using the optimization block model 27, it is desirable to calculate such an optimal shape that can be reflected on a steel-sheet structure shape. In view of this point, using three-dimensional elements of any of pentahedrons, hexahedrons, heptahedrons, and octahedrons and having at least one pair of two parallel surfaces is more likely to satisfy such a demand. In addition, it is preferable to enhance the optimization accuracy by disposing three-dimensional elements of uniformly-sized pentahedrons or polyhedrons having more than five plane faces.

Figure 4:
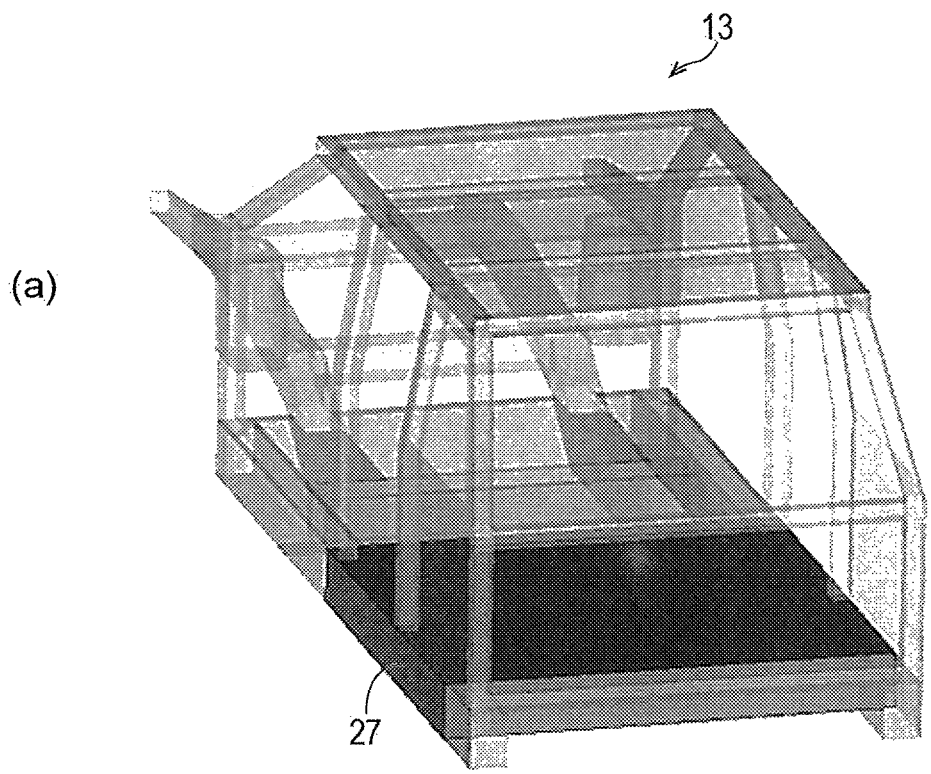
FIG. 4 illustrates a structure model in which an optimization block model is installed in the defined design space.
Figure 4:
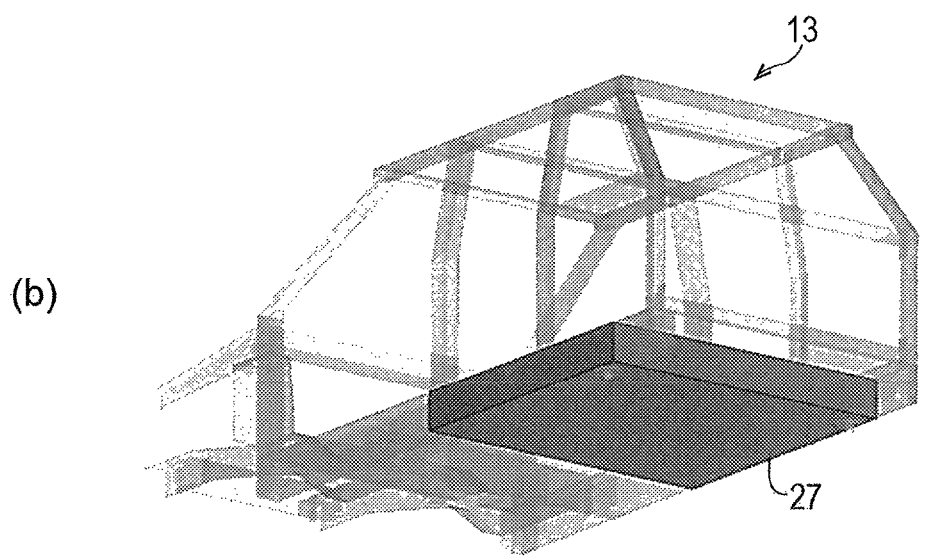
Figure 5:
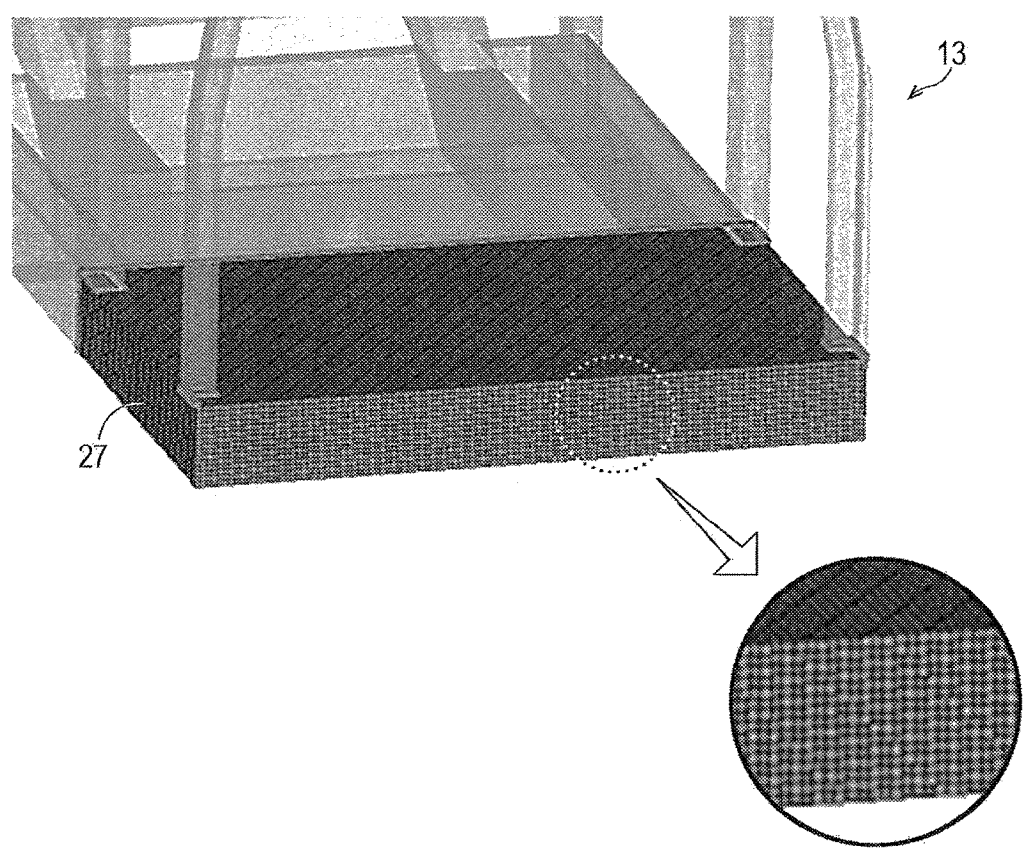
FIG. 5 illustrates the cross section of the optimization block model.

FIGS. 4(a) and 4(b) illustrate the structure model in which a rectangular optimization block model 27 is generated. The three-dimensional elements used in this example are hexahedrons, as illustrated in FIG. 5.

In addition, it is preferable to generate an optimization block model 27 along the surfaces of the structure that define the design space 25 and in such a manner that three-dimensional elements are finely divided parallel to the surface having the largest area among all the surfaces of the design space. For example, in the case where a portion of the floor in a automotive body is defined as a design space 25 as illustrated in FIG. 3, a rectangular optimization block, having top and bottom surfaces having a largest area, is generated as illustrated in FIG. 4 and the top and bottom surfaces having a largest area are designed to be parallel to the floor surface of the automotive body.

The reason why the optimization block model 27 is generated in this manner is as follows. For example, the floor surface of an automotive body is formed of a sheet. It is thus preferable that, when optimization calculation is performed using the optimization block model 27, such calculation results are desired that the three-dimensional elements remain in a sheet form. Forming the model as described above makes it highly likely to bring such calculation results that the three-dimensional elements remain in a sheet form, whereby the model is highly effective in actual use.

[Coupling Unit]

The coupling unit 19 couples the generated optimization block model 27 with a structure, which is another portion of the automotive body. The coupling involves the use of rigid elements, sheet elements, or beam elements.

In order to accurately transmit the load from the structure model 13 (automotive body) to the optimization block model 27, coupling the optimization block model 27 with the structure is preferably performed in such a manner that original joint portions between the portions eliminated for forming the design space 25 and the structure model 13 (automotive body) are reflected. In addition, the entire cross-sectional surface of the structure model 13 (automotive body) is coupled with the optimization block model 27.

Figure 6:
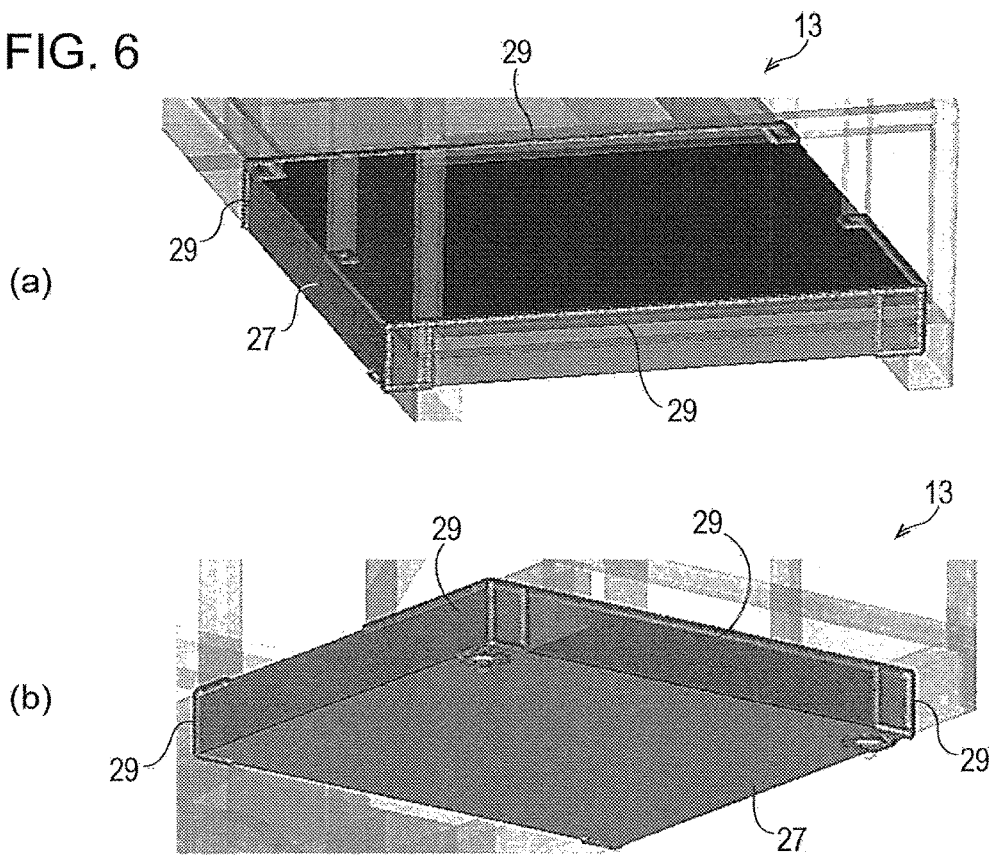
FIG. 6 illustrates the optimization block model installed in the structure model after the optimization block model is coupled with the structure model.

In FIG. 6, connection portions 29 are drawn by white lines.

[Analytic-Condition Input Unit]

The analytic-condition input unit 21 inputs an analytic condition for optimization calculation. Examples of the analytic condition include the position at which the structure is constrained, the position at which the load is applied, the volume fraction of the material, maximizing the rigidity, minimizing the displacement, and minimizing the stress.

Figure 7:
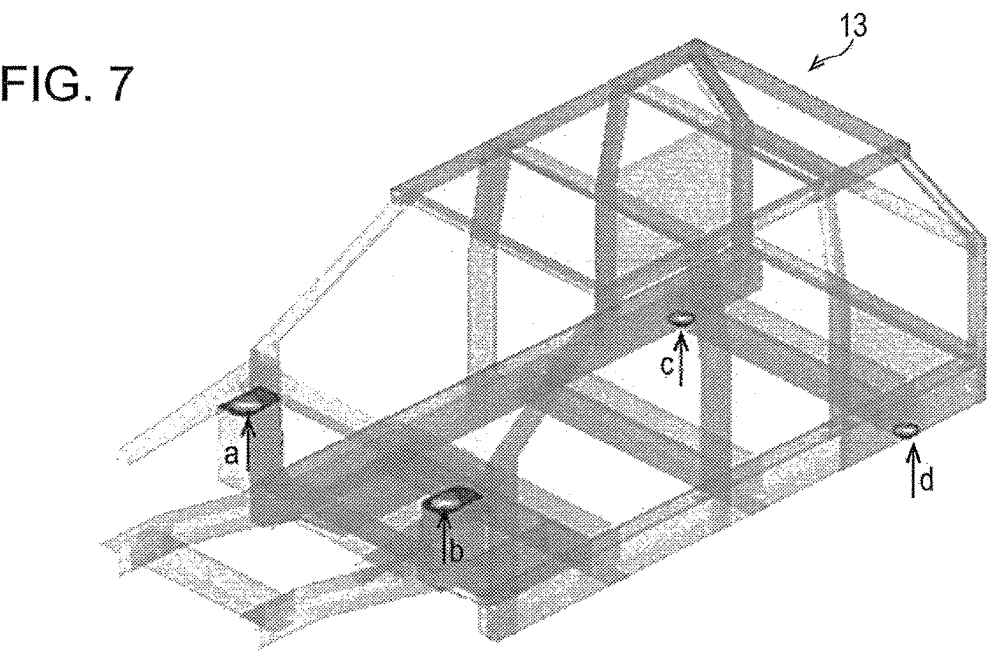
FIG. 7 illustrates the load or constraint conditions used as analytic conditions.

To calculate, for example, a maximum rigidity of the optimization block model 27 under the condition that a torsional load is applied to the automotive body, the following conditions are used: four positions (a, b, c, and d) of the automotive body are determined as illustrated in FIG. 7, three positions among the four positions are constrained, and a load is applied to the remaining one position.

[Optimization Analyzing Unit]

The optimization analyzing unit 23 performs optimization calculation using numerical analysis on the optimization block model 27 on the basis of the input analytic condition.

The optimization analyzing unit 23 preferably performs discretization of optimization parameters. It is preferable to perform discretization in such a manner that a penalty coefficient in the discretization is defined as 2 or higher or 3 to 20 times the size of the reference three-dimensional element.

Performing discretization of the optimization parameters enables reflection of the optimal shape on the steel-sheet structure shape.

The optimization analyzing unit 23 may perform topology optimization processing or optimization processing involving other calculation methods. Thus, commercially available analysis software using finite elements is usable as an example of the optimization analyzing unit.

Figure 8:
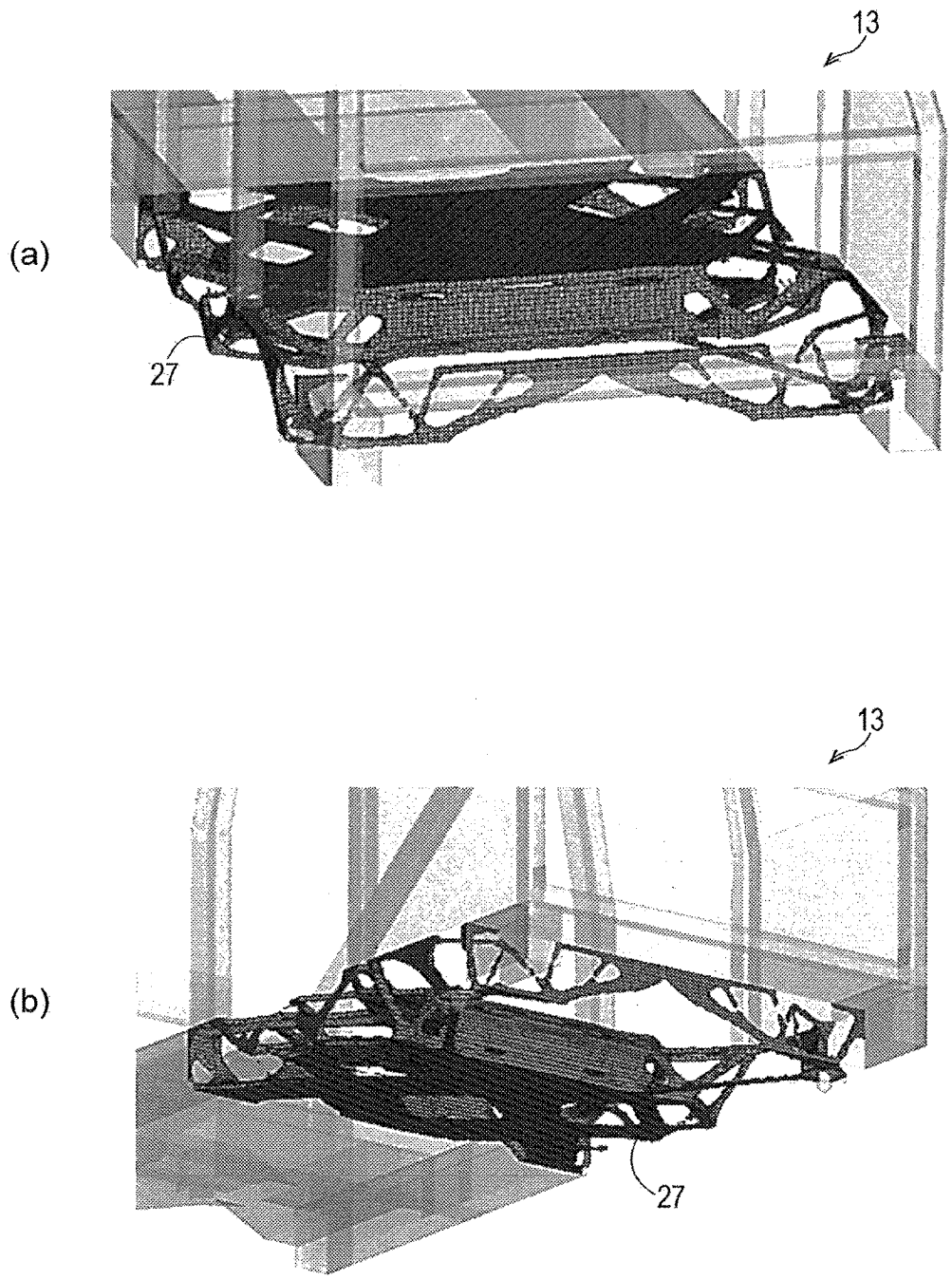
FIG. 8 illustrates the results obtained after performing optimization analysis.

After the optimization analysis processing is performed, three-dimensional elements forming an optimal shape that satisfies a given analytic condition are left among the three-dimensional elements in the optimization block model 27, as illustrated in FIG. 8.

Here, it is noteworthy that the load is transmitted to the optimization block model 27 through the connection portions 29 from the structure model 13. Specifically, it is noteworthy that transmitting the load from the structure model 13 to the optimization block model 27 causes deformation of the optimization block model 27 or changes of the direction of the load or the like in the process of the optimization calculation, but the load condition such as the direction of the load at various time points is reflected on the optimization block model 27 so that the optimization block model 27 finally has an optimal shape.

This feature is described in detail using a comparative example.

Figure 9:
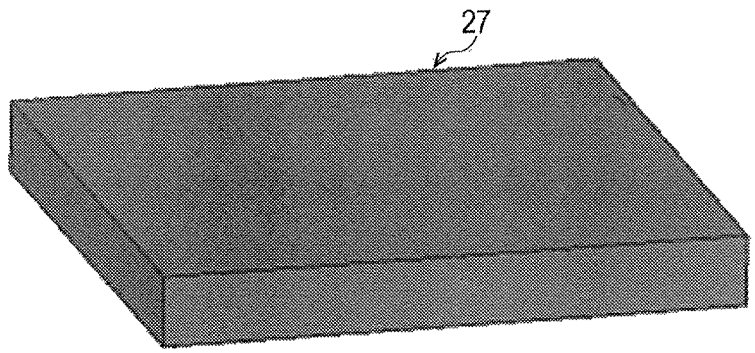
FIG. 9 illustrates an independent optimization block model according to a comparative example.
Figure 9:
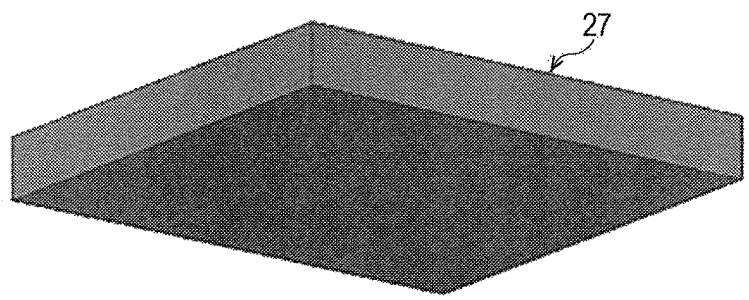
Figure 10:
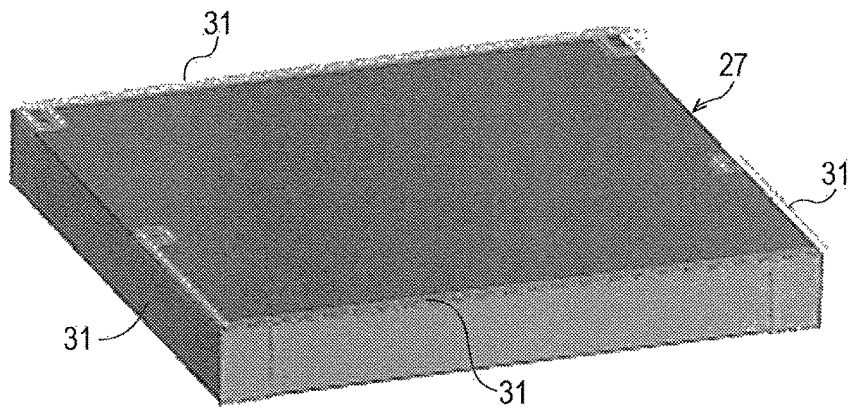
FIG. 10 illustrates a constraint condition applied to an independent optimization block model.
Figure 10:
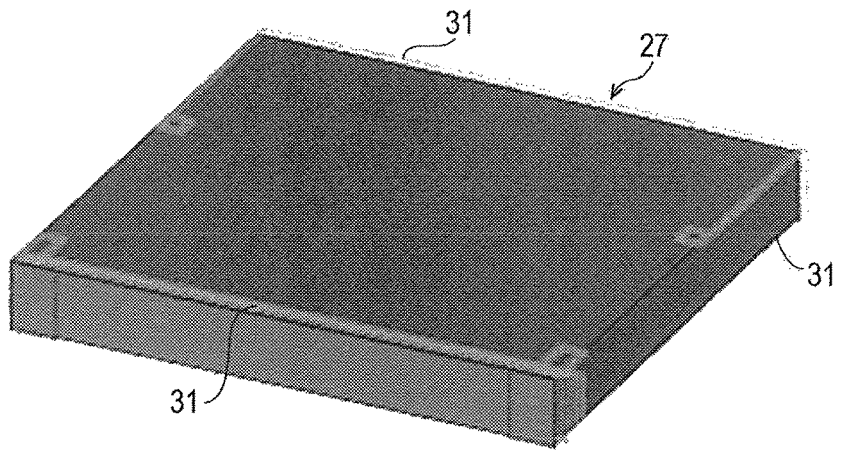
Figure 11:
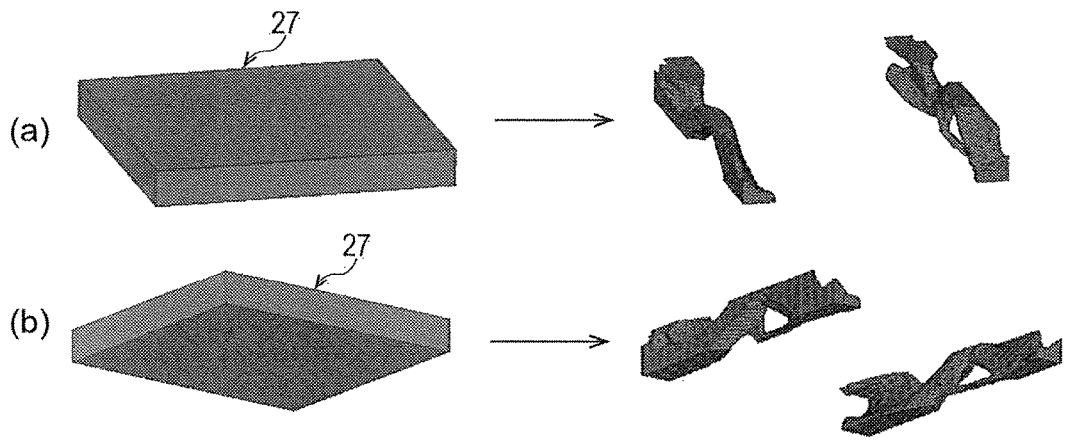
FIG. 11 illustrates results of analysis performed on an independent optimization block model.

FIG. 9 illustrates a single model in which the rectangular optimization block model 27 illustrated in FIG. 4 is not installed in the structure design space 25. FIG. 10 illustrates a model, which is the model illustrated in FIG. 9, to which a constraint condition is applied at the same positions as the connection portions 29 illustrated in FIG. 6, which are defined as constrained portions 31. FIG. 11 illustrates results obtained after performing optimization analysis using an analytic condition similar to that in the case where the optimization block model 27 is installed into the above-described structure model 13 while being constrained at the constrained portions 31 illustrated in FIG. 10. As illustrated in FIG. 11, performing optimization on a separate optimization block model 27 produces a shape totally different from the one produced by performing optimization on an optimization block installed in the structure model 13; the shape does not include at all a portion for connecting between the left and the right of the automotive body. Such a difference in shape produces different results in, for example, rigidity improvement rate. Thus, coupling the optimization block model with the structure model as in embodiments of the present invention involves not only simply constraining the optimization block model but also transmission of the load, and thus enables calculation of a practically available optimal shape.

This feature is described in detail in exemplary embodiments described below.

Figure 12:
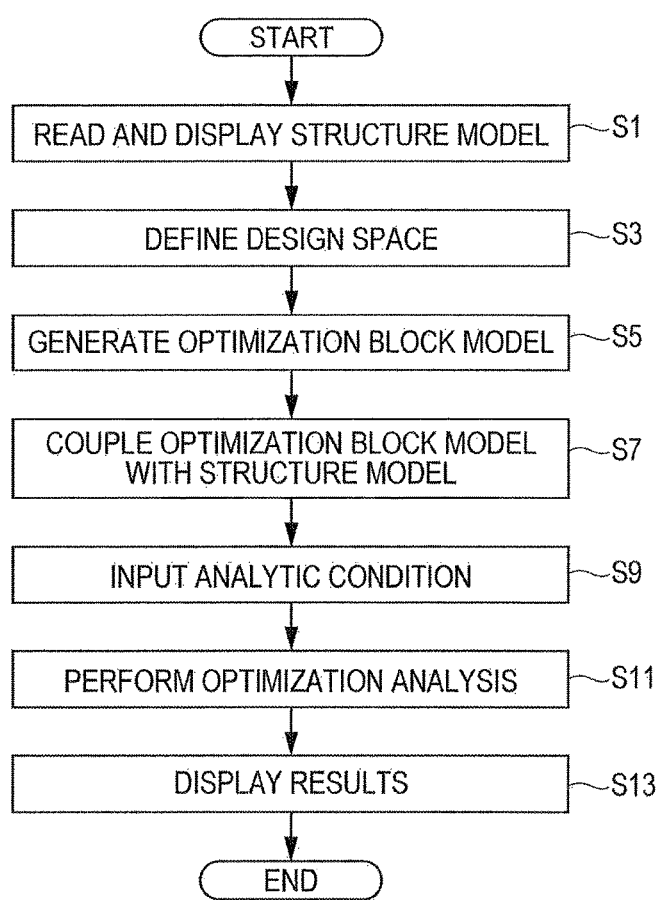
FIG. 12 is a flowchart of a processing flow of a shape optimization analyzing apparatus according to an embodiment of the present invention.

Referring now to the flowchart illustrated in FIG. 12, the processing flow is described when analysis is actually performed using a shape optimization analyzing apparatus 1 having the above-described configuration. The processing described below is performed in response to an operator instructing a PC through the input device 5 so that each function of the processing unit 11 in the PC performs processing.

When an operator instructs the PC through the input device 5 to read a file of the structure model 13, the structure model 13 is read from the storage device 7 and displayed on the display device 3 (S1).

The operator instructs the PC to define a design space 25, which is to be optimized, in the displayed structure model 13. Specifically, the operator designates coordinates of a portion in the structure model 13 that is to be defined as a design space 25 and instructs the PC to eliminate the elements in the designated portion. Upon receipt of this instruction, the design-space defining unit 15 eliminates the elements in the designated portion to define the design space 25 (S3).

When the design space 25 is defined, the operator instructs the optimization-block-model generating unit 17 to generate an optimization block model 27 of such a size as to be containable in the design space 25.

The instruction includes designation of a surface of the design space 25 that is to be used as a reference for generating the optimization block model 27. For example, for generating a rectangular optimization block model 27 illustrated in FIG. 4, an instruction is issued to generate an optimization block model 27 with reference to a rectangular surface on the side of an automotive body. Then, the optimization-block-model generating unit 17 extrudes the rectangular surface in the automobile width direction to generate a meshed optimization block model 27 (S5).

After the optimization block model 27 has been generated, the operator instructs the PC to couple the optimization block model 27 and the structure model 13 together. The instruction includes designation of an element that is to be used as a coupling element from among a rigid element, a sheet element, and a beam element.

Upon receipt of the instruction, the coupling unit 19 couples the optimization block model 27 and the structure together (S7).

After the coupling processing is complete, the operator inputs an analytic condition (S9). Examples of the analytic condition include, as described above, the position at which the structure is constrained, the position at which the load is applied, the volume fraction of the material, maximizing the rigidity, minimizing the displacement, and minimizing the stress. When the operator finishes inputting the analytic condition, the operator instructs the PC to perform the analysis.

Upon receipt of the instruction, the optimization analyzing unit 23 performs calculation of the optimization analysis (S11). After the optimization calculation, elements used for the optimization block model 27 are displayed on the display unit (S13).

The operator constructs a shape model obtained by the optimization calculation and evaluates the rigidity on the basis of the model by another structure analysis calculation.

As described above, this embodiment includes the following processing for analysis: defining a portion that is to be optimized in the structure model as a design space 25; generating an optimization block model 27 in the defined design space 25; and coupling the optimization block model 27 with the structure model. Thus, the load can be appropriately transmitted to the optimization block model 27 through the connection portions 29 of the structure model, whereby an optimal shape can be accurately calculated.

This accurate calculation enables, for example, optimization of an automotive body structure, enhancement of the rigidity or crash worthiness, and reduction of the weight while the rigidity or crash worthiness is/are regulated at predetermined values.

In the above description, hexahedrons illustrated in FIG. 5 are taken as examples of three-dimensional elements that constitute the optimization block model 27. Other preferable examples of three-dimensional elements are described as three-dimensional elements of any of pentahedrons, hexahedrons, heptahedrons, and octahedrons and having at least one pair of two parallel surfaces.

Figure 13:
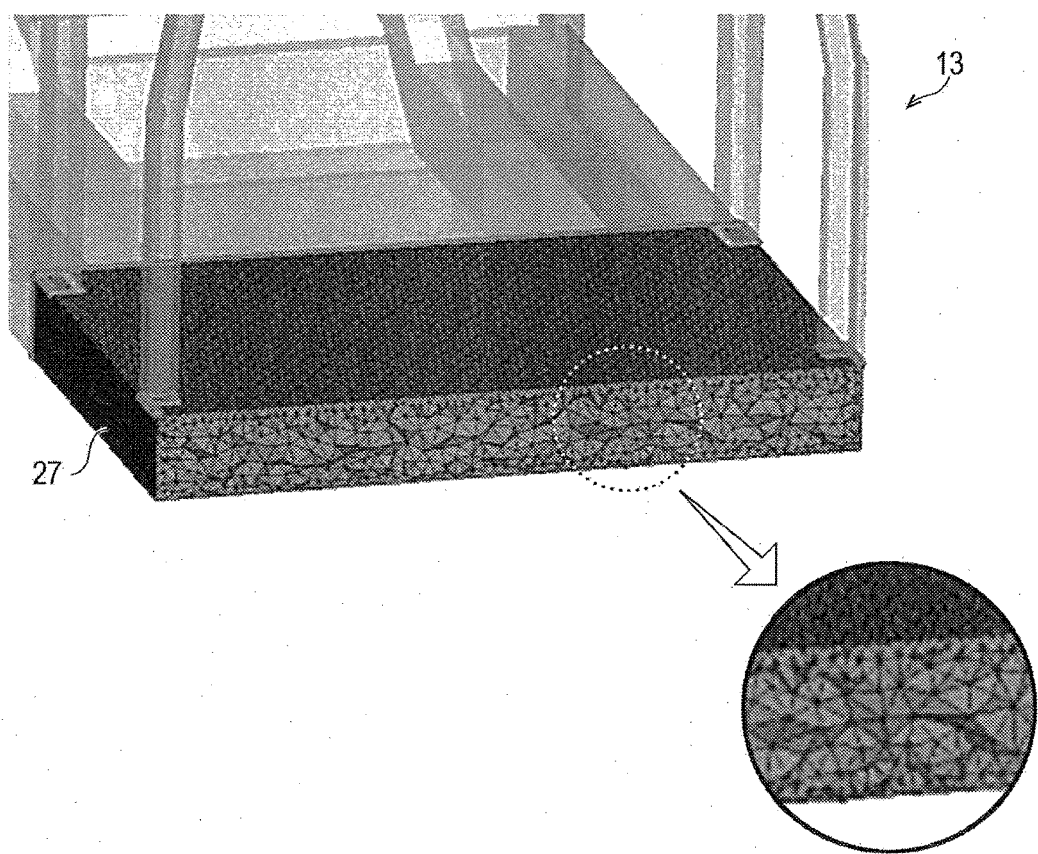
FIG. 13 illustrates the cross section of an optimization block model according to another embodiment.

However, some embodiments of the present invention do not exclude the case of using a tetrahedron illustrated in FIG. 13 as an example of three-dimensional elements that constitute the optimization block model 27. In the case of using tetrahedron elements, a model can be generated in such a manner that only the outline of the design space 25 is formed and the inner space is automatically filled up. This model, however, is difficult to reflect on a steel-sheet structure since a portion at which tips of three surfaces, which are triangular as a feature of the shape of the three-dimensional element, adjoin is sharp.

Figure 14:
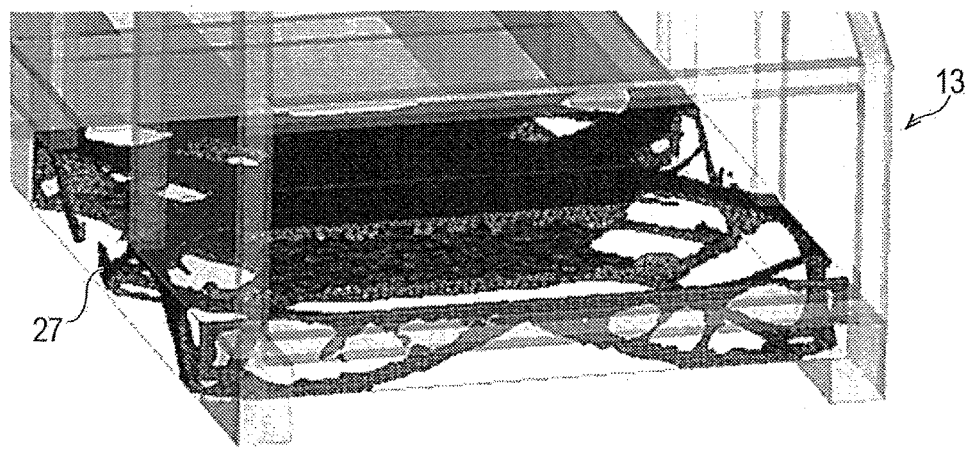
FIG. 14 illustrates results of analysis performed on the optimization block model illustrated in FIG. 13.
Figure 14:
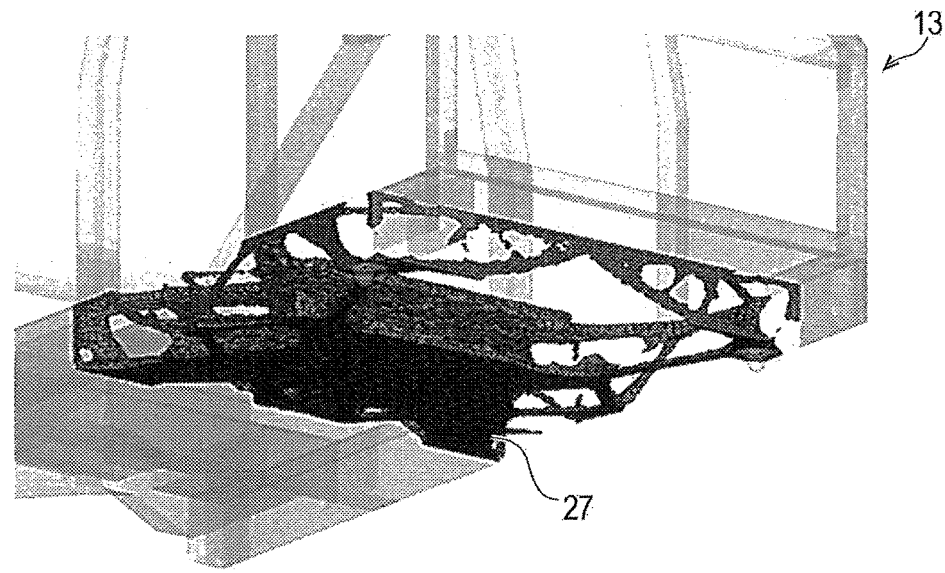

FIG. 14 illustrates the results of analysis performed on the optimization block model 27 illustrated in FIG. 13. As is clear from FIG. 14, the shape remaining as an optimal shape has extreme recesses and protrusions, the shape is difficult to reflect on the steel sheet shape, and the shape loses a lid-shaped portion (an original cross member) in the center portion compared to the case of the hexahedrons illustrated in FIG. 8.

Second Embodiment

This embodiment relates to another example of the optimization-block-model generating unit 17. The optimization-block-model generating unit 17 generates an optimization block model in the following manner: nodes are disposed at the connection portions 29 at which the optimization block model is coupled with plane elements or three-dimensional elements constituting the structure model 13; and hexahedron three-dimensional elements, used as three-dimensional elements forming the optimization block model 27, are stacked so as to be arranged along the flat surfaces including the nodes disposed at the connection portions 29.

Referring now to the drawings, the generation of an optimization block model is specifically described with reference to exemplary embodiments.

Figure 15:
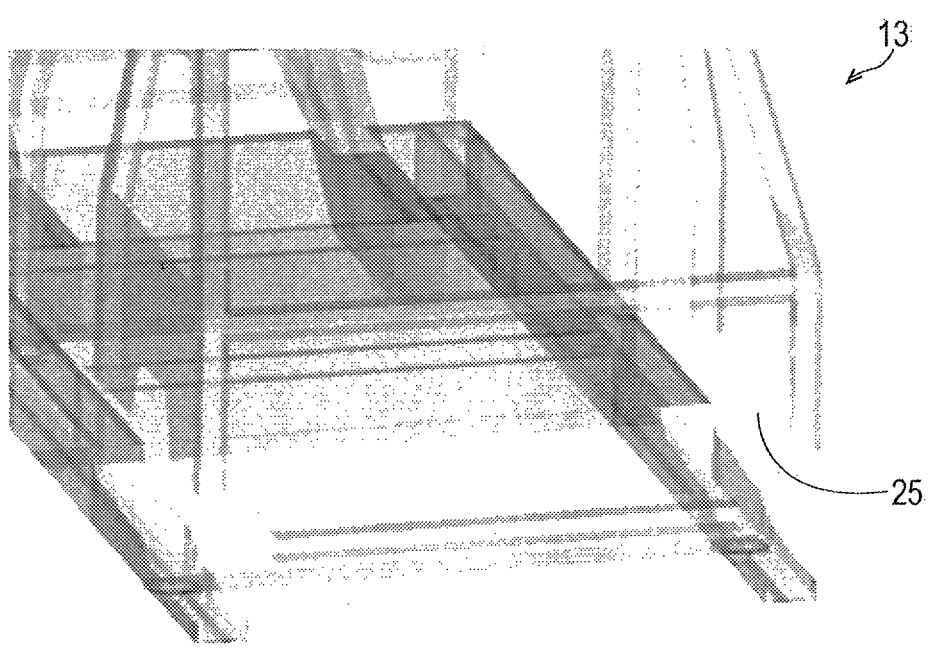
FIG. 15 illustrates a design space according to a second embodiment of the present invention.
Figure 15:
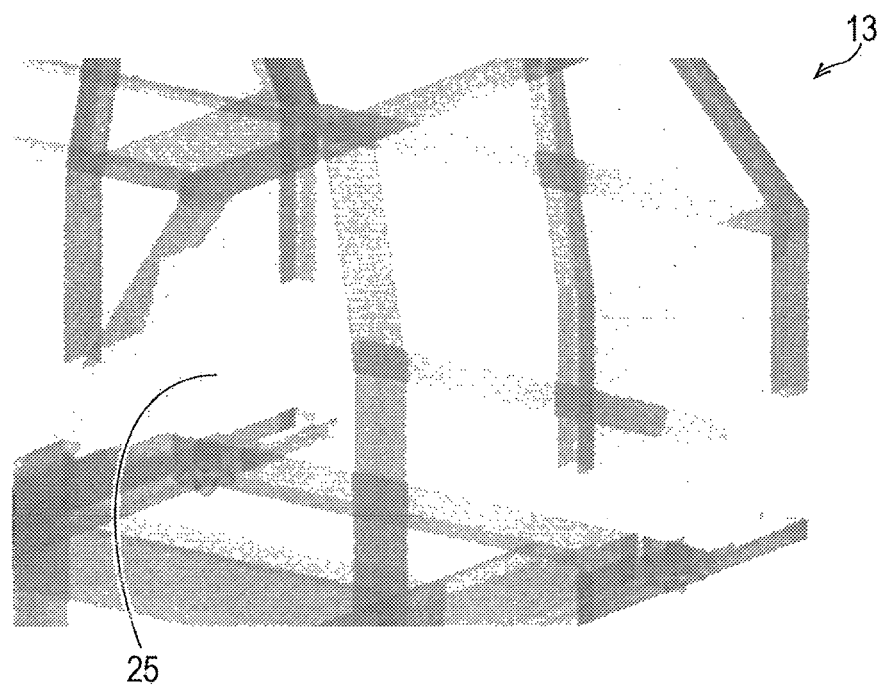

FIG. 15 illustrates the state where the design space 25 is defined in part of a rear portion of the structure model 13 representing an automotive body. As illustrated in FIG. 15, in this example, elements that are not parallel to the reference axis surface are disposed at the positions at which the structure model 13 constituted by plane elements and three-dimensional elements of the optimization block model 27 are coupled. This embodiment is applicable to such a case.

Figure 16:
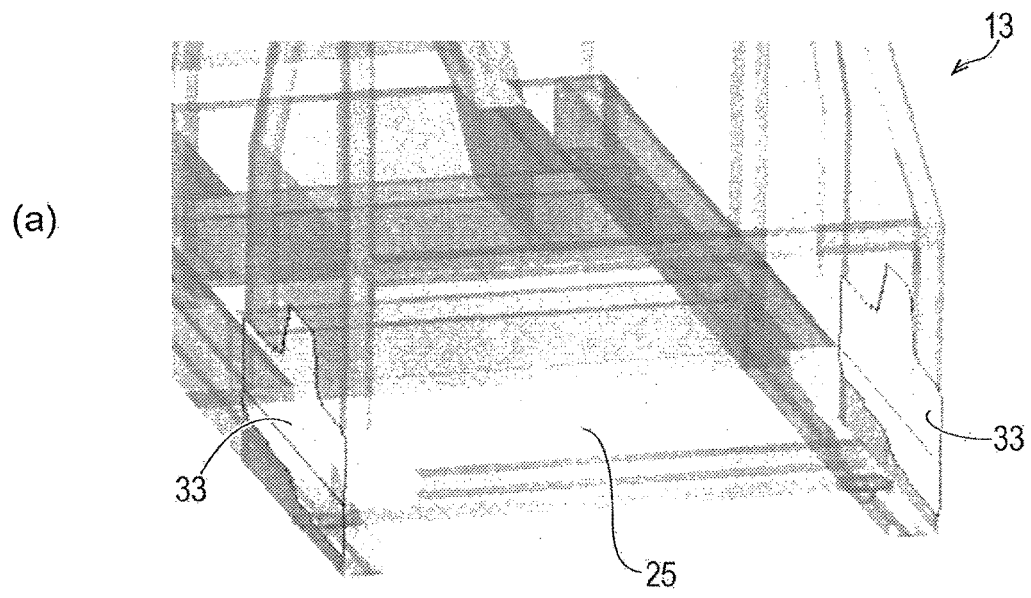
FIG. 16 illustrates a method for generating an optimization block model according to the second embodiment of the present invention.
Figure 16:
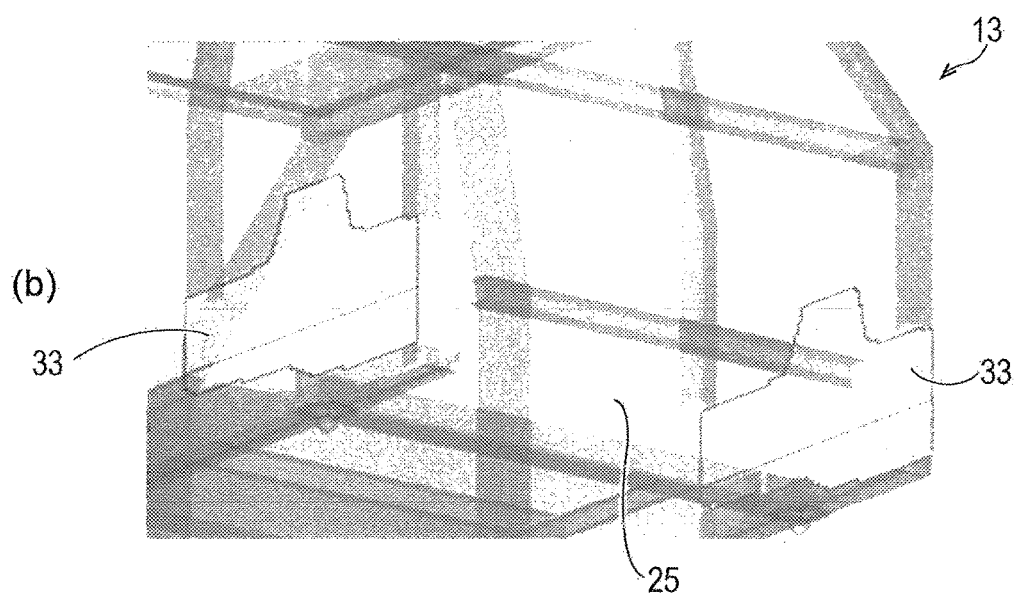

As illustrated in FIG. 16, the optimization-block-model generating unit 17 generates reference surfaces 33, which serve as a reference for generating an optimization block model 27, with sheet elements by connecting, with a straight line, nodes disposed at the portions on the side surfaces of the automotive body from which the structure model 13 is eliminated. After the reference surfaces 33 have been generated, the reference surfaces 33 are extruded in the automotive width direction in such a manner as to be integrated together by sharing the nodes to generate the optimization block model 27.

Figure 17:
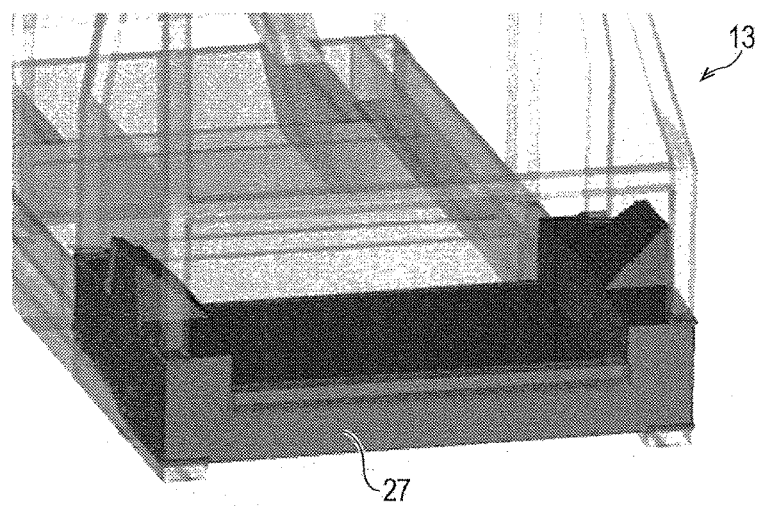
FIG. 17 illustrates a method for generating an optimization block model according to the second embodiment of the present invention.
Figure 17:
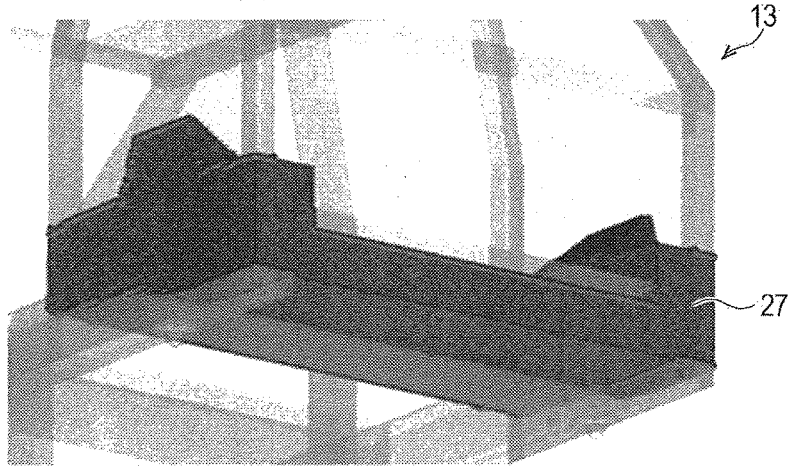
Figure 18:
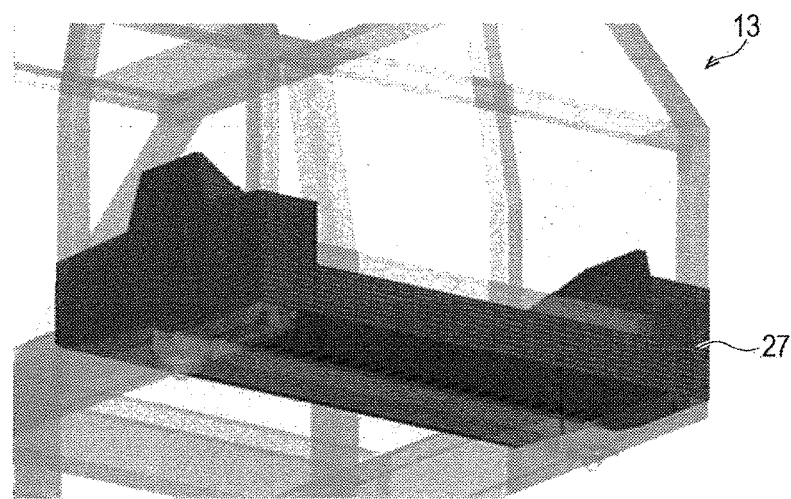
FIG. 18 illustrates a method for generating an optimization block model according to the second embodiment of the present invention.

FIG. 17 and FIG. 18 illustrate the state where the optimization block model 27 has been generated.

Generating the reference surfaces 33 in this manner and generating the optimization block model 27 using these reference surfaces 33 are effective in making inclined portions or the like with smooth straight lines. Thus, the optimization block model 27 and the structure model 13 (automotive body) are smoothly coupled together, whereby the load is advantageously transmitted in an accurate manner.

Figure 19:
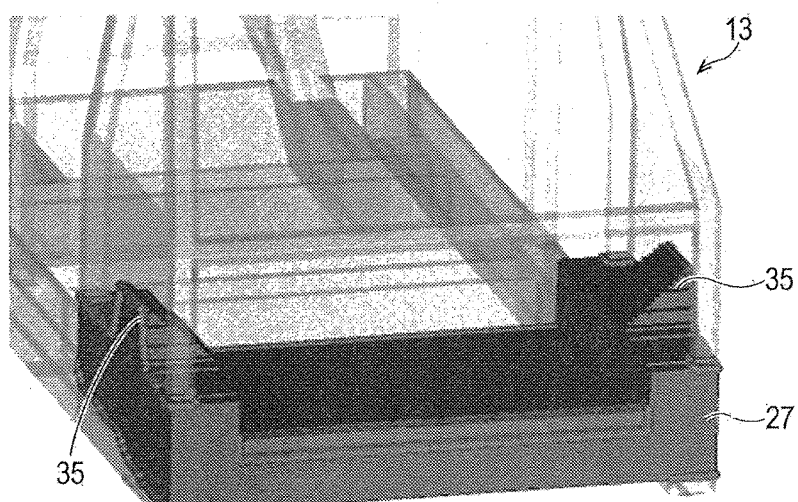
FIG. 19 illustrates, in comparison with the method for generating the optimization block model according to the second embodiment of the present invention, an optimization block model generated by the method according to the first embodiment.
Figure 19:
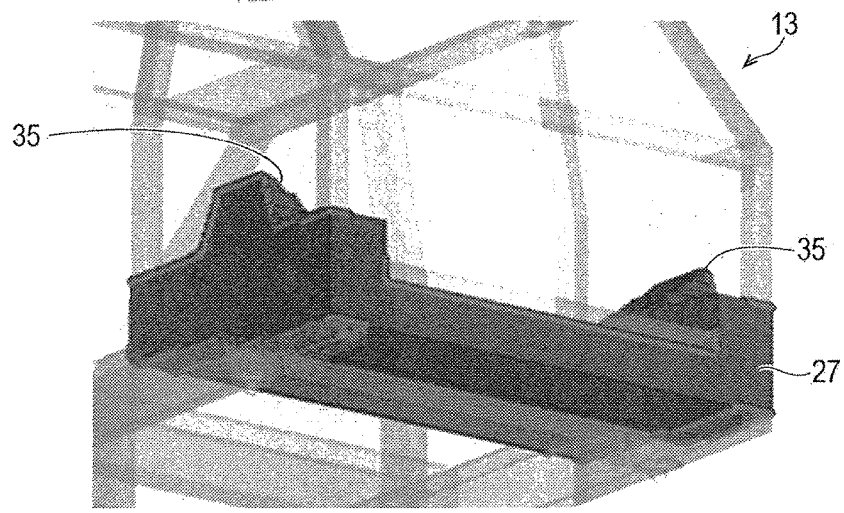
Figure 20:
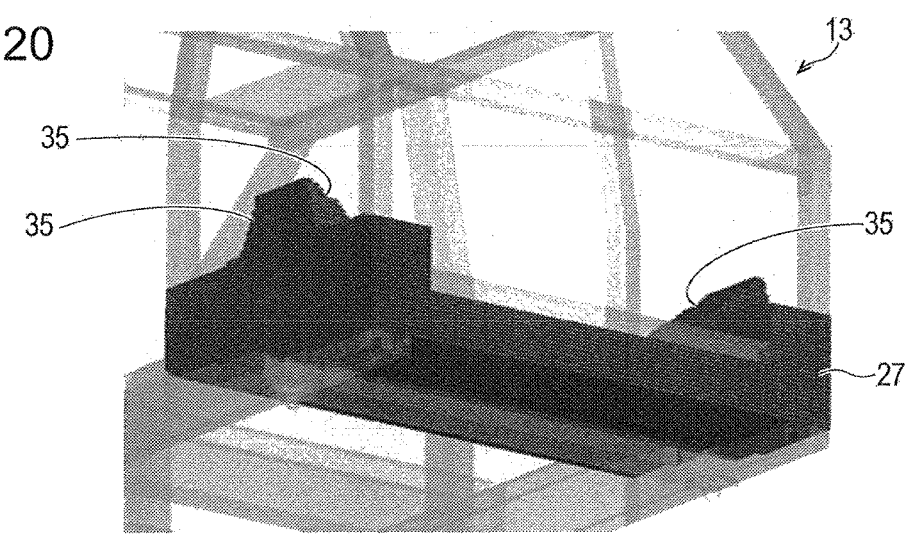
FIG. 20 illustrates, in comparison with the method for generating the optimization block model according to the second embodiment of the present invention, an optimization block model generated by the method according to the first embodiment.

As a comparative example, FIG. 19 and FIG. 20 illustrate an example where an optimization block model 27 is generated without generating reference surfaces 33 in advance as in the case of the first embodiment. The example illustrated in FIG. 19 and FIG. 20 has more steps 35 in inclined portions than in the case of the model illustrated in FIG. 17 and it is obvious that the example is not smooth.

According to the embodiment, even in the case where the optimization block model 27 is shaped so as to have an inclined surface, the optimization block model 27 is smoothly coupled with the structure model 13 (automotive body) and thus the load is accurately transmitted.

Third Embodiment

In the first and second embodiments, the cases are described where the optimization-block-model generating unit independently generates a separate optimization block model 27. Alternatively, the optimization-block-model generating unit 17 may generate an optimization block model 27 by forming multiple blocks constituted by three-dimensional elements and by coupling the multiple blocks together using rigid elements, beam elements, or plane elements.

The coupling is specifically described below.

Figure 21:
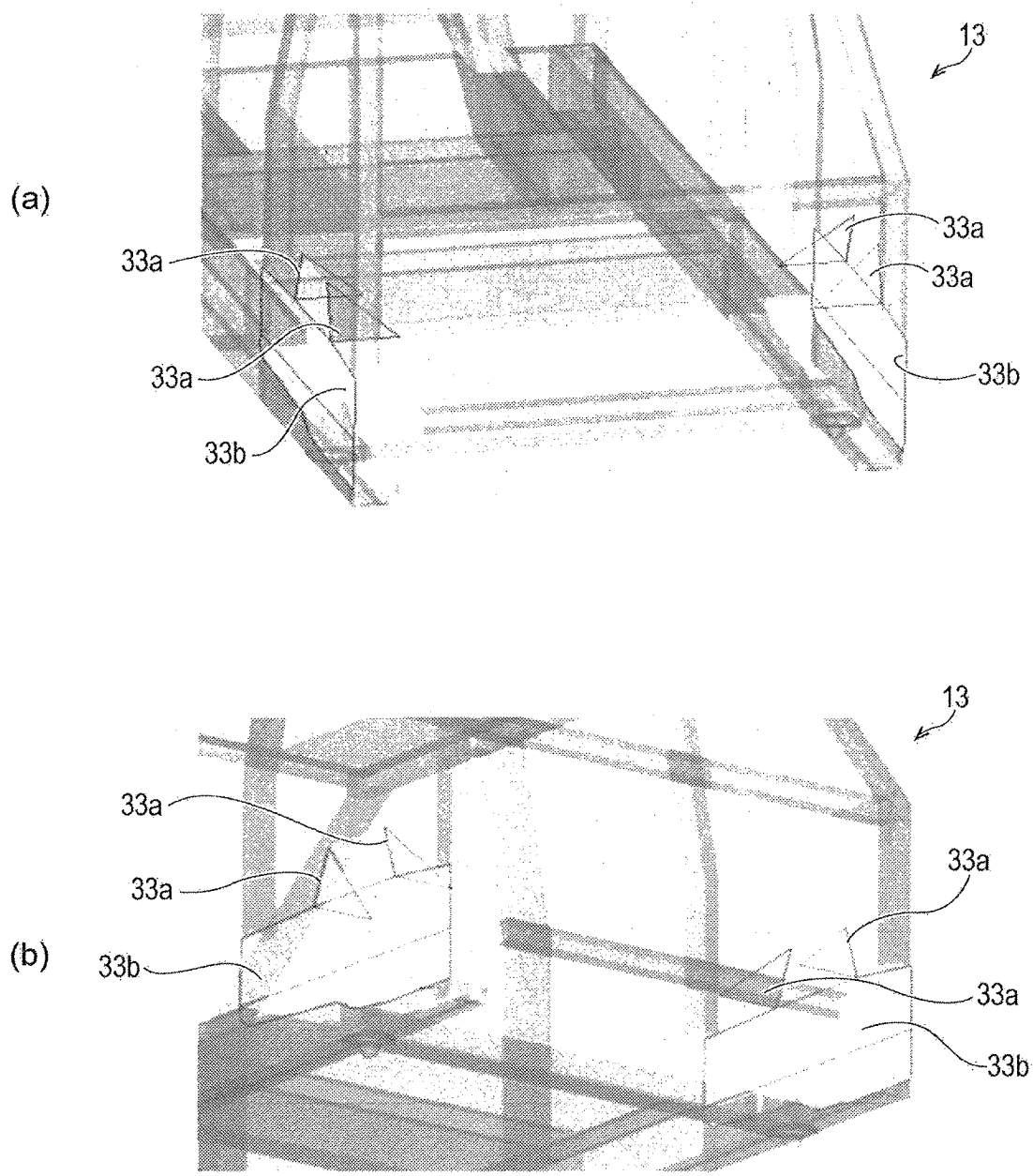
FIG. 21 illustrates a method for generating an optimization block model according to a third embodiment of the present invention.
Figure 22:
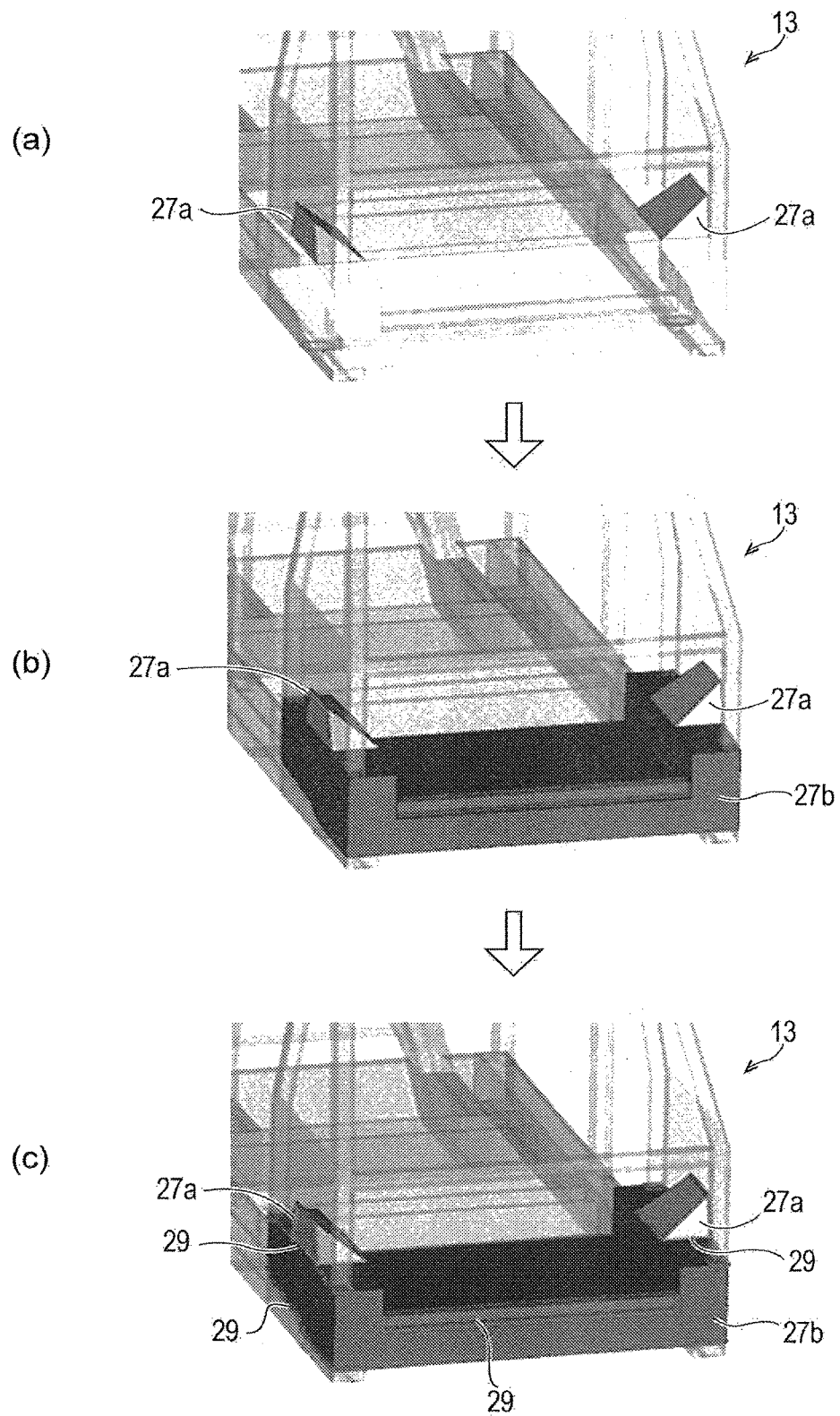
FIG. 22 illustrates a method for generating an optimization block model according to the third embodiment of the present invention.

FIG. 21 and FIG. 22 are one illustration of the third embodiment, in which an optimization block model 27 is generated by a method for generating reference surfaces 33 as described in the second embodiment and using multiple blocks.

Firstly, multiple independent reference surfaces 33a and 33b are formed in the design space 25 (see FIG. 21). The triangular reference surfaces 33a in the upper portion are firstly extruded in the automotive front-rear direction to generate upper blocks 27a, which are triangular prisms (see FIG. 22(a)), the reference surfaces 33b below the triangular prisms are then extruded in the automotive width direction to generate a lower block 27b (see FIG. 22(b)), and the generated blocks and the automotive body are coupled together at the connection portions 29 (see FIG. 22(c)).

The optimization block model 27 is generated in the form of multiple divided blocks. Thus, an optimization block model 27 can be generated even in a design space 25 formed of a complex shape, such as a complex-shape block or a sloped block, unlike a rectangular parallelepiped.

In addition, generating the optimization block model 27 in the form of multiple divided blocks enables defining the optimization block model 27 with smooth surfaces, whereby the optimization block model 27 can be smoothly coupled with the structure model 13 and the load can be accurately transmitted.

Either the upper blocks 27a or the lower block 27b may be formed first. In addition, either coupling the blocks together or coupling each block with the automotive body may be performed first.

Optimization is basically performed on the space in which the nodes are shared, and thus it is preferable that inter-block coupling accounts for 20% or lower in terms of the coupling area.

EXAMPLES OF EMBODIMENTS OF THE INVENTION

Analysis was performed to evaluate the rigidity improvement rate using automotive bodies formed into optimal shapes obtained from the analyses performed using the optimization block models 27 illustrated in FIG. 4 to FIG. 6.

The following three conditions are assumed to calculate the optimal shape:

the case where one block is formed with hexahedrons as three-dimensional elements (Example of the Embodiments of Present Invention 1);

the case where multiple blocks are formed with hexahedrons as three-dimensional elements and subjected to rigidity coupling (Example of the Embodiments of Present Invention 2); and the case where one block is formed with pentahedrons and hexahedrons as three-dimensional elements (Example of the Embodiments of Present Invention 3).

The following three models are prepared as comparative examples:

a model formed with tetrahedrons as three-dimensional elements separately without being coupled with the automotive body, illustrated in FIG. 9 (Comparative Example 4);

a model formed with tetrahedrons and pentahedrons as three-dimensional elements separately in the similar manner (without being coupled with the automotive body) (Comparative Example 5); and a model formed by subjecting multiple blocks to rigidity coupling, each block being formed with hexahedrons as three-dimensional elements separately in the similar manner (without being coupled with the automotive body) (Comparative Example 6).

The dimensions of the automotive body used for the analysis were 1200 mm in width, 3350 mm in length, and 1130 mm in height. Steel sheets having sheet thicknesses within a range from 0.8 mm to 2.0 mm and a steel material were used. The reference weight is 125 kg and the average torsional rigidity in the original form is 25.1 (kN*m/deg).

As the load and constraint conditions for rigidity analysis, a automotive-body torsional mode was used in which a load of 0.5 kN is applied at one of four portions a, b, c, and d illustrated in FIG. 7, constraining the remaining three portions.

Table 1 shows the conditions and the results.

TABLE 1

| | No. | Coupling with Automotive Body | Type of Three-dimensional Element | Rigidity Coupling of Blocks | Rigidity Improvement Rate (%) |
|---|---|---|---|---|---|
| Examples of the Embodiments of the Present Invention | 1 | Done | Hexahedron | Undone | 11.5 |
| | 2 | Done | Hexahedron | Done | 8.2 |
| | 3 | Done | Pentahedron and Hexahedron | Undone | 8.8 |
| Comparative Example | 4 | Undone | Tetrahedron | Undone | −1.5 |
| | 5 | Undone | Tetrahedron and Pentahedron | Undone | 0.2 |
| | 6 | Undone | Hexahedron | Done | 0.3 |

As shown in Table 1, in comparison with the comparative examples 4 to 6 in which the rigidity improvement rate negligibly increases, the rigidity improvement rate (the rigidity improvement rate with respect to the original structure model illustrated in FIG. 2) increases to a large degree in the examples of the embodiments of present inventions 1 to 3. These results have proved that the method of constructing a model and the calculation method according to aspects of the present invention are appropriate for optimization.

These results have proved that the method of constructing a model and the calculation method according to aspects of the present invention in which, unlike in the existing technology in which the shape optimization is independently performed, part of the structure model is coupled with the structure model can generate an appropriate optimal shape.

In this example, a steel-based material was used as a material of the automotive body, but various other materials such as aluminum, titanium, magnesium, glass, resin, or rubber may also be used without causing any problem.

REFERENCE SIGNS LIST 1 shape optimization analyzing apparatus
3 display device 5 input device
7 storage device
9 operation data memory
9a data storage region
9b operation region
11 processing unit
13 structure model
15 design-space defining unit
17 optimization block model
19 coupling unit
21 analytic-condition input unit
23 optimization analyzing unit
25 design space
27 optimization block model
27a upper block
27b lower block
29 connection portion
31 constrained portion
33 reference surface
33a reference surface
33b reference surface
35 step

The invention claimed is:

1. A method of forming an automotive steel-sheet structure, comprising:
   a design-space defining step of defining a design space by eliminating a desired part of plane elements and/or three-dimensional elements which form a structure model of the automotive steel-sheet structure;
   an optimization-block-model generating step of connecting nodes located on a side of the design space with straight lines to form a reference surface, and extruding the reference surface in a desired direction to generate an optimization block model in the defined design space to extend along surfaces of the structure model that define the design space in such a manner that the optimization block model is formed of three-dimensional elements including any of pentahedrons, hexahedrons, heptahedrons, and octahedrons, each three-dimensional element having multiple pairs of parallel surfaces and being positioned such that one of the multiple pairs of parallel surfaces having a largest area is oriented parallel to a surface having a largest area among all surfaces of the design space;
   a coupling step of coupling the generated optimization block model with the structure model;
   an analyzing step of performing analysis in accordance with input of an analytic condition to calculate an optimal shape of the optimization block model; and
   a structure forming step of forming the automotive steel-sheet structure in accordance with the calculated optimal shape of the optimization block model.

2. The method of forming an automotive steel-sheet structure according to claim 1, wherein in the optimization-block-model generating step, the optimization block model is generated by disposing nodes at connection portions at which the optimization block model is to be coupled with the plane elements or the three-dimensional elements forming the structure model and by stacking hexahedron three-dimensional elements, used as the three-dimensional elements that form the optimization block model, so that the three-dimensional elements are arranged along flat surfaces including the nodes disposed at the connection portions.

3. The method of forming an automotive steel-sheet structure according to claim 1, wherein the optimization block model includes a plurality of block bodies formed of three-dimensional elements, and the plurality of block bodies are coupled together with rigid elements, beam elements, or plane elements.

4. The method of forming an automotive steel-sheet structure according to claim 1, wherein discretization is performed using an optimization parameter in optimization calculation using numerical analysis.

5. An apparatus for forming an automotive steel-sheet structure, the apparatus comprising a computer including a data storage unit and a processing unit, the processing unit including:
   a design-space defining unit that defines a design space by eliminating a desired part of plane elements and/or three-dimensional elements which form a structure model of the automotive steels-sheet structure;
   an optimization-block-model generating unit that connects nodes located on a side of the design space with straight lines to form a reference surface, and extrudes the reference surface in a desired direction to generate an optimization block model in the defined design space to extend along surfaces of the structure model that define the design space in such a manner that the optimization block model is formed of three-dimensional elements including any of pentahedrons, hexahedrons, heptahedrons, and octahedrons, each three-dimensional element having multiple pairs of parallel surfaces and being positioned such that one of the multiple pairs of parallel surfaces having a largest area is oriented parallel to a surface having a largest area among all surfaces of the design space;
   a coupling unit that couples the generated optimization block model with the structure model;
   an analytic-condition input unit that inputs an analytic condition for analysis on a desired portion of the structure model;
   an optimization analyzing unit that performs optimization calculation using numerical analysis on the optimization block model on the basis of the input analytic condition; and
   a structure forming unit that forms the automotive steel-sheet structure in accordance with the result of the optimization calculation.

6. The apparatus for forming an automotive steel-sheet structure according to claim 5, wherein the optimization-block-model generating unit generates the optimization block model by disposing nodes at connection portions at which the optimization block model is to be coupled with the plane elements or the three-dimensional elements forming the structure model and by stacking hexahedron three-dimensional elements, used as the three-dimensional elements that form the optimization block model, so that the three-dimensional elements are arranged along flat surfaces including the nodes disposed at the connection portions.

7. The apparatus for forming an automotive steel-sheet structure according to claim 5, wherein the optimization-block-model generating unit generates the optimization block model with a plurality of blocks formed of three-dimensional elements, and the plurality of blocks are coupled together with rigid elements, beam elements, or plane elements.

8. The apparatus for forming an automotive steel-sheet structure according to claim 5, wherein the optimization analyzing unit performs discretization using an optimization parameter in optimization calculation using numerical analysis.

9. The apparatus for forming an automotive steel-sheet structure according to claim 5, wherein the optimization analyzing unit performs optimization calculation using topology optimization.

10. The method of forming an automotive steel-sheet structure according to claim 1, wherein in the optimization-block-model generating step, the optimization block model that extends along surfaces of the structure model that define the design space and in which the three-dimensional elements are finely divided parallel to a surface of the design space having the largest area is generated.

11. The apparatus for forming an automotive steel-sheet structure according to claim 5, wherein the optimization-block-model generating unit generates the optimization block model that extends along surfaces of the structure model that define the design space and in which the three-dimensional elements are finely divided parallel to a surface of the design space having the largest area.

\* \* \* \* \*